US007102761B2

(12) United States Patent
De Lega et al.

(10) Patent No.: US 7,102,761 B2
(45) Date of Patent: Sep. 5, 2006

(54) SCANNING INTERFEROMETRY

(75) Inventors: Xavier Colonna De Lega, Middletown, CT (US); David A. Grigg, Glastonberry, CT (US); Peter J. De Groot, Middletown, CT (US)

(73) Assignee: Zygo Corporation, Middlefield, CT (US)

( * ) Notice: Subject to any disclaimer, the term of this patent is extended or adjusted under 35 U.S.C. 154(b) by 321 days.

(21) Appl. No.: 10/855,788

(22) Filed: May 27, 2004

(65) Prior Publication Data
US 2004/0252310 A1    Dec. 16, 2004

Related U.S. Application Data

(60) Provisional application No. 60/478,300, filed on Jun. 13, 2003.

(51) Int. Cl.
*G01B 9/02* (2006.01)
(52) U.S. Cl. ..................................... 356/512
(58) Field of Classification Search ................ 356/497, 356/511–514
See application file for complete search history.

(56) References Cited

U.S. PATENT DOCUMENTS

| 2,612,074 | A | 9/1952 | Mirau | |
| 4,639,139 | A | 1/1987 | Wyant et al. | 356/359 |
| 5,073,018 | A | 12/1991 | Kino et al. | 359/368 |
| 5,398,113 | A | 3/1995 | de Groot | 356/360 |
| 5,640,270 | A | 6/1997 | Aziz et al. | 359/368 |
| 5,784,164 | A | 7/1998 | Deck et al. | 356/359 |
| 5,956,141 | A | 9/1999 | Hayashi | 356/357 |
| 2003/0137671 | A1 | 7/2003 | de Groot et al. | 356/512 |
| 2004/0027576 | A1 | 2/2004 | de Groot et al. | 356/498 |

OTHER PUBLICATIONS

D.M. Gale et al., "Linnik microscope imaging of integrated circuit structures", *Applied Optics*, vol. 35, No. 1, pp. 131-146.

*Primary Examiner*—Hwa (Andrew) Lee
*Assistant Examiner*—Marissa J Detschel
(74) *Attorney, Agent, or Firm*—Fish & Richardson P.C.

(57) ABSTRACT

An interferometry method includes: imaging test light reflected from at least a first portion of a test surface to interfere with reference light on a camera and form an interference pattern, wherein the imaging defines a depth of focus for the light reflected from the test surface, and wherein the test light and reference light are derived from a common source; varying an optical path length difference between the test light and reference light over a range larger than the depth of focus, wherein the optical path length difference corresponds to a difference between a first optical path between the common source and the camera for the test light and a second optical path between the common source and the camera for the reference light; and maintaining the first portion of the test surface within the depth of focus as the optical path length difference is varied.

35 Claims, 11 Drawing Sheets

302   304

SCANNING INTERFEROMETRY

CROSS-REFERENCE TO RELATED APPLICATIONS

This application claims priority to U.S. Provisional Patent Application Ser. No. 60/478,300 entitled "Scanning interferometry" and filed Jun. 13, 2003, the contents of which are incorporated herein by reference.

BACKGROUND

Interferometric optical techniques are widely used to measure optical thickness, flatness, and other geometric and refractive index properties of precision optical components such as glass substrates used in lithographic photomasks. For example, to measure the surface profile of a measurement surface, one can use an interferometer to combine a test wavefront reflected from the test surface with a reference wavefront reflected from a reference surface to form an optical interference pattern. The test wavefront and the reference wavefront, typically from a common light source, travel over different optical paths to their respective surfaces and then onto a camera where they form an interference pattern. The difference between the lengths of those optical paths determine an optical path difference (OPD) between the test and reference wavefronts at the optical interference pattern. Spatial variations in the intensity profile of the optical interference pattern correspond to phase differences between the combined test and reference wavefronts caused by variations in the profile of the test surface relative to the reference surface.

Phase-shifting interferometry (PSI) can be used to accurately determine the phase differences between the wavefronts and the corresponding profile of a test surface. With PSI, the optical interference pattern is recorded for each of multiple phase-shifts between the reference and test wavefronts to produce a series of optical interference patterns that span at least a full cycle of optical interference (e.g., from constructive, to destructive, and back to constructive interference). For each optical interference pattern in the series, a detector or camera records intensity values over a lateral spatial region. For each lateral spatial location or "pixel", the series of interference patterns defines a series of intensity values or "interferogram" which has a sinusoidal dependence on phase-shifts producing fringes in the interferogram. Each interferogram is a sinusoid with a phase-offset equal to the phase difference between the combined test and reference wavefronts for that pixel location. Using numerical techniques known in the art, the phase-offset for each spatial location is extracted from the fringes in the interferograms to provide a profile of the test surface relative the reference surface. Such numerical techniques are generally referred to as phase-shifting algorithms.

The phase-shifts in PSI can be produced by changing the optical path length from the test surface to the interferometer relative to the optical path length from the reference surface to the interferometer. For example, the test surface can be moved relative to the reference surface, changing the OPD. An interferogram spanning a full cycle of optical interference can be produced by scanning the OPD over a full wavelength of the common light source. It is therefore unnecessary to scan the OPD over a distance larger than a couple of wavelengths in PSI.

Interferometers using PSI are particularly well-suited for measuring nominally flat surfaces. For example, a single-wavelength visible interferometer using phase-shifting techniques can measure surface variations on the order of Angstroms. Such accuracy is important in applications such as characterizing of glass substrates used in lithographic photomasks. However, for rough surface profiles with step discontinuities or features larger than a wavelength PSI may suffer from impairments due to $2\pi$ phase ambiguities.

Another type of interferometer is a broadband scanning interferometer, which uses a broadband source and scans the OPD between the reference and test paths of the interferometer. Because the broadband source has a limited coherence length, interference fringes in the interferogram are only present where the OPD between the test and reference paths for corresponding points on the test surface and the flat reference surface is less than the coherence length. The fringes in the interferogram are localized within a coherence envelope. Thus, the scanning interferometer can resolve a step, or an otherwise large and/or discontinuous, variation in the surface of interest by scanning the OPD, recording multiple interferograms, and determining for each pixel which OPD values produce fringes in the interferogram. This localization of fringes is not impaired by $2\pi$ phase ambiguities. For a simple reflective surface the coherence envelope has a single peak at zero-OPD. Therefore, in contrast to PSI, broadband scanning interferometry typically scans the OPD over a distance larger than a wavelength in order to scan over a range of height variation in the test surface. See, e.g., N. Balasubramanian in U.S. Pat. No. 4,340,306 and P. de Groot in U.S. Pat. No. 6,195,168 for additional information regarding scanning interferometers. Such broadband scanning interferometry may be thought of as an example of "low-coherence scanning interferometry."

SUMMARY

The invention features techniques, methods and systems for profiling complex surfaces using low-coherence scanning interferometry. Complex surface structures (e.g., a thin film structure on a test surface) can produce correspondingly complex low-coherence scanning interference signals. Applicants recognize that such interference signals may contain useful information about the complex surface even for a non-zero optical path length difference (OPD). In other words, for example, analysis of an interference signal extending over a range as large or larger than the coherence length can yield useful information about the complex structure. For example, the low-coherence interference signal produced by a complex thin film structure may contain amplitude and phase profiles from which information such as film thicknesses may be extracted.

Microscope objective lenses can be used in such scanning interferometry to produce interference microscopes (e.g., of the Mirau, or Linnik type). For example, in a typical low-coherence scanning interferometer, the OPD is scanned such that the zero-OPD position remains within the depth of focus (DOF) of the interference microscope. Rather than optimize imaging of the zero-OPD position, however, techniques described herein maintain at least a selected portion of the test surface in focus while the zero-OPD position is scanned over the complex test surface for a range large enough to generate extended interference data for the selected portion (e.g., a range on the order of the coherence length, which may be larger than the DOF of the interference microscope). As a result, the extended interference data for the selected portion of the test surface is obtained with high lateral resolution We now summarize various aspects and features of the invention.

In general, in one aspect, the invention features a method including: imaging test light reflected from at least a first portion of a test surface to interfere with reference light on a camera and form an interference pattern, wherein the imaging defines a depth of focus for the light reflected from the test surface, and wherein the test light and reference light are derived from a common source; varying an optical path length difference between the test light and reference light over a range larger than the depth of focus, wherein the optical path length difference corresponds to a difference between a first optical path between the common source and the camera for the test light and a second optical path between the common source and the camera for the reference light; and maintaining the first portion of the test surface within the depth of focus as the optical path length difference is varied.

Embodiments of the method may include any of the following features.

The method may further include collecting images of the interference pattern as the optical path length difference is varied.

The common source may have a coherence length, and the optical path length difference may be varied over a range larger than the coherence length. In some embodiments, for example, the coherence length of the common source may be limited by the spectral bandwidth of the common source. In a particular case, for example, the spectral bandwidth may be greater than 10% of the mean wavelength. In other embodiments, for example, the common source may be a spatially extended source, and the coherence length may be limited by the spatial extent of the common source and a numerical aperture for light used to illuminate the test surface. In a particular example for this case, the numerical aperture may be greater than 0.3.

The test surface may be part of a thin film structure.

The imaging may include using a beam splitter to separate light emitted from the common source into the reference light and the test light. The imaging may further include directing the reference light to reflect from a reference surface.

The varying of the optical path length difference may include varying the position of the reference surface.

The test light may be transmitted through the beam splitter, and varying the optical path length difference may include varying the position of the beam splitter.

The test light may be transmitted through the beam splitter, and varying the optical path length difference may include varying the position of the beam splitter and the reference surface.

The method may further include using an objective positioned prior to the beam splitter to direct the reference light onto the reference surface.

The method may further include using an objective positioned between the beam splitter and the reference surface to direct the reference light onto the reference surface. In one such example, the varying of the optical path length difference may include varying the position of the reference surface. In another such example, the varying of the optical path length difference may include simultaneously varying the position of the reference surface and the objective.

The method may further include adjusting an angular orientation of at least one of the reference surface and the beam splitter to cause an image of the camera through the imaging system to be substantially parallel to the reference surface.

In general, in another aspect, the invention features an apparatus including: an interferometric imaging system configured to image test light reflected from at least a first portion of a test surface to interfere with reference light on a camera and form an interference pattern, wherein the interferometric imaging system defines a depth of focus for the light reflected from the test surface, and wherein the test light and reference light are derived from a common source, wherein the interferometric imaging system is configured to maintain the first portion of the test surface within the depth of focus as an optical path length difference between the test light and the reference light is varied, wherein the optical path length difference corresponds to a difference between a first optical path between the common source and the camera for the test light and a second optical path between the common source and the camera for the reference light; and an electronic control system which during operation causes the interferometric imaging system to vary the optical path length difference over a range larger than the depth of focus of the imaging system and maintain the first portion of the test surface within the depth of focus as the optical path length difference is varied.

Embodiments of the apparatus may include features corresponding to any of the features described above for the method.

As used herein, the numerical aperture (NA) of an imaging system at some object (image) position is the product of the refractive index in the object (image) medium by the sine of the angular radius of the image of the imaging system pupil in that same medium.

As used herein, the object depth of focus (DOF) of an imaging system is an estimate of how much longitudinal displacement of the object would result into a degradation of the image produced at a given image (detector) plane. When an imaging system is diffraction limited the object DOF can be related to the numerical aperture in object space using the formula: $DOF=1.22\lambda/NA^2$, where $\lambda$ is the wavelength of light.

As used herein, the temporal coherence length of a source point for a band-limited spectrum of width $\Delta\lambda$, (full-width at half maximum) and centered at a mean wavelength $\lambda_0$ is $\lambda_0^2/\Delta\lambda$.

As used herein, the spatial coherence of an extended monochromatic or quasi-monochromatic source is (to a first-order approximation for a uniform source distribution): $2\lambda/NA^2$, for an interferometer where the source fills the pupil of a collimating objective of numerical aperture NA. A filled pupil means that if F is the focal length of the microscope objective then the source size at the pupil is at least 2 F NA. If the source is smaller than the pupil then the spatial coherence of an extended monochromatic or quasi-monochromatic source is: $8\lambda F^2/D^2$ where D is the source diameter.

Unless otherwise defined, all technical and scientific terms used herein have the same meaning as commonly understood by one of ordinary skill in the art to which this invention belongs. In case of conflict with publications, patent applications, patents, and other references mentioned incorporated herein by reference, the present specification, including definitions, will control.

The details of one or more embodiments of the invention are set forth in the accompanying drawings and the description below. Other features, objects, and advantages of the invention will be apparent from the description and drawings, and from the claims.

Figure 1:
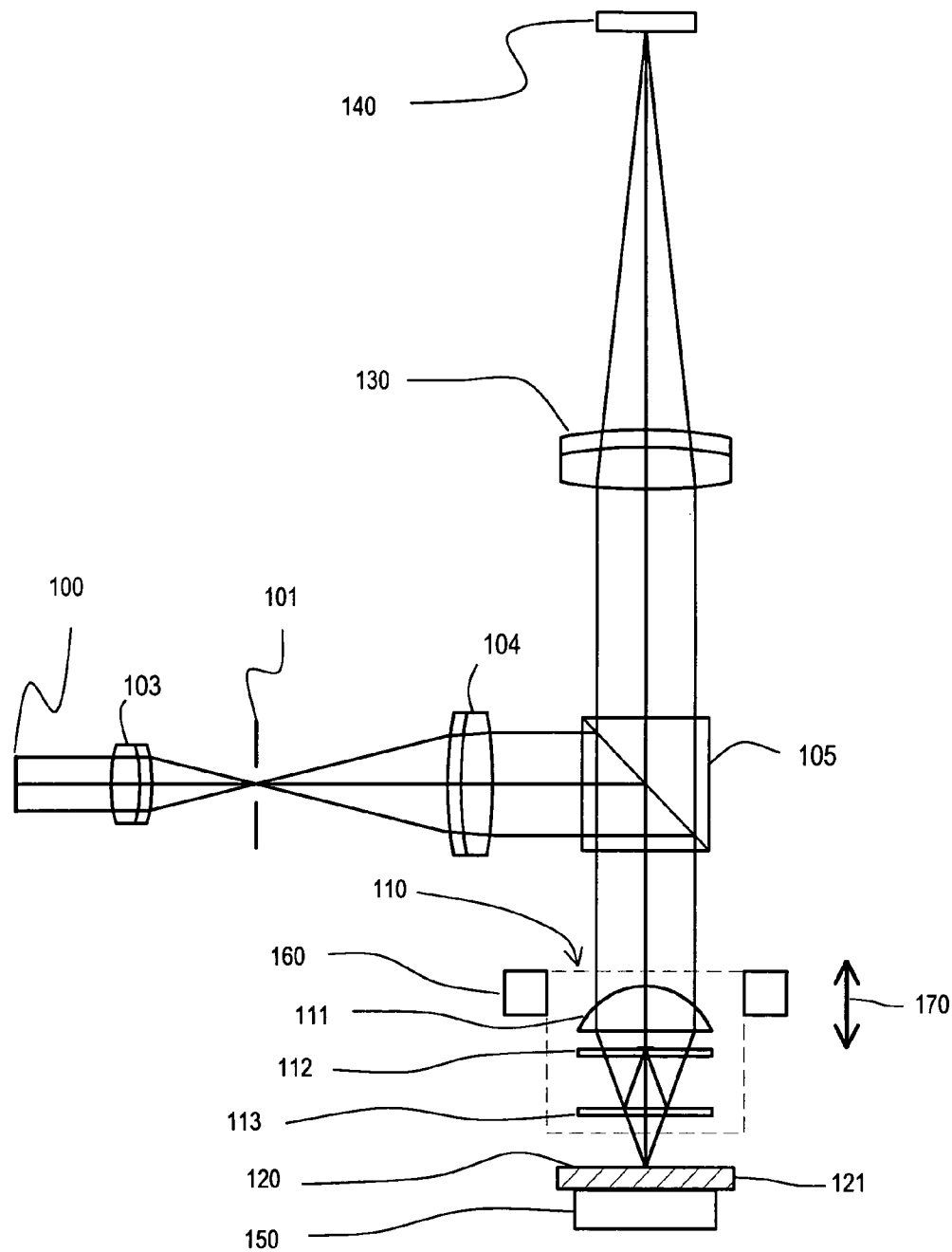
FIG. 1 is an interference microscope system equipped with a Mirau objective.

Common reference numerals in different figures refer to common elements.

DESCRIPTION

FIG. 1 shows an example of a Mirau interference microscope system used for broadband scanning interferometry. An extended, broadband source 100 illuminates a test object surface 120 through telescopic relay lenses 102 and 103, non-polarizing beam splitter 105, and a Mirau assembly 110. The Mirau assembly 110 includes a microscope objective lens 111, a reference surface 112 and a beam splitter 113. The surface 120 of a test object 121 is imaged onto a detector 140 (e.g., a camera) via microscope objective lens 111 and tube lens 130. A field stop 101 can be used for initial alignment of the test surface.

In the system of FIG. 1, prior art OPD scans used to capture interference data include moving the test object 121 with respect to the microscope along the optical axis 170 using a test object actuator 150, and moving the entire Mirau assembly 110 along the same axis 170 using a Mirau assembly actuator 160. Both types of OPD scans facilitate clear identification of the zero-OPD position (corresponding to the peak of the coherence envelope) by allowing it to remain in the focal plane of the microscope. However, in both cases, the test surface 120 goes in and out of focus when the OPD scan length exceeds the DOF of the imaging system.

Figure 2:
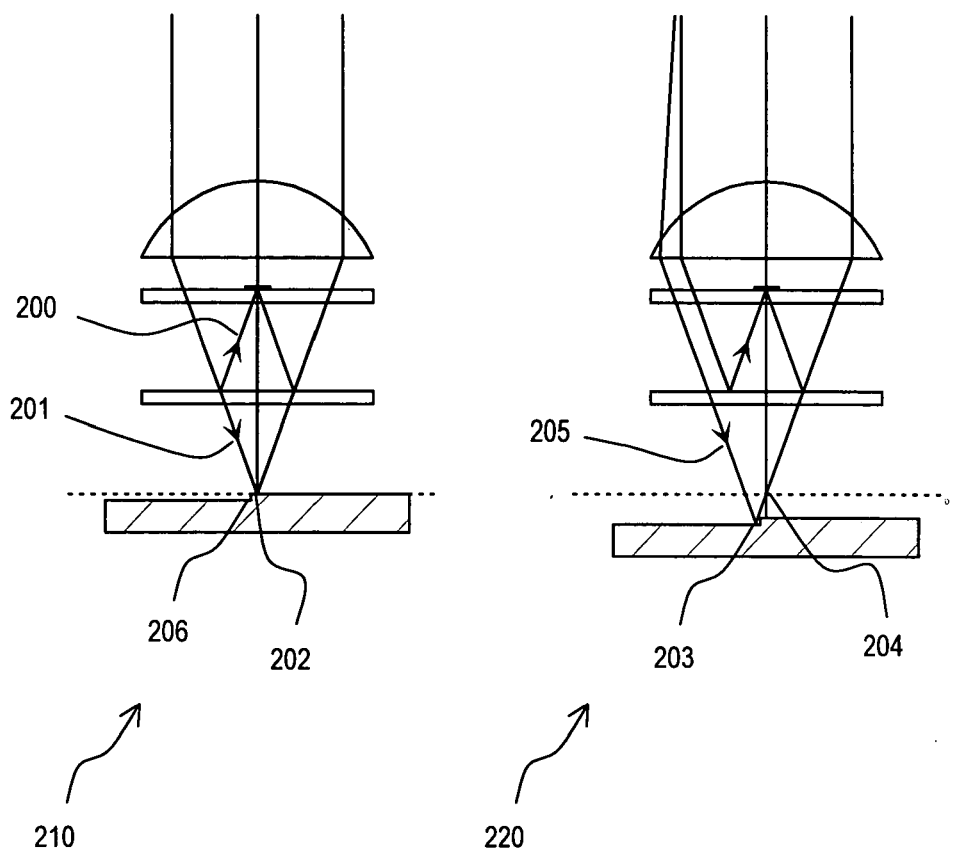
FIG. 2 shows two sketches of paths taken by light rays through a Mirau assembly with a test object at two different locations relative to the Mirau assembly along an OPD scan.

The loss of focus of the test surface 120 is illustrated in FIG. 2, which shows two sketches, indicated by reference numerals 210 and 220, of paths taken by light rays through a Mirau assembly with a test object at two different locations relative to the Mirau assembly along an OPD scan. In sketch 210, the paths of a reference ray 200 and a test ray 201 interfere on the detector (not shown) at a location corresponding to the image of the in-focus test point 202. Both rays 200 and 201 come from the same point on the illumination source. In the course of an OPD scan the test object (or Mirau assembly) is displaced continuously, resulting in the situation sketched in 220. The test object surface is now out of focus. Consequently, the test ray 205 that appears to come from the point in focus 204 no longer reflects from the original point 202 on the test object surface but rather from point 203.

The test object surface in FIG. 2 has a small height discontinuity 206. Points 202 and 203 are located on opposite sides of this height discontinuity 206. It follows that the interference signal recorded as a function of scan position by the detector is influenced by the height of both points 202 and 203, which introduces distortions of the interference signal recorded by the detector. Similar sketches can be drawn for rays coming from various positions on the illumination source. The measured interference signal is the sum of all the individual contributions from rays across the entire illumination source. The interference signal collected is thus influenced by a region on the test object surface that is potentially much larger than the lateral resolution of the imaging system, particularly in the case of high numerical aperture microscope objectives at visible or ultraviolet wavelengths.

Figure 3:
FIG. 3 shows interference patterns of a stepped object shown close to the best focus position and at an out of focus position.
Figure 3:
Figure 3:
Figure 3:

In addition to the effect just described, a sharp object feature such as the step 206 shown in FIG. 2 creates a diffracted wavefront that interferes with the reflected wavefront, creating an undesirable interference pattern at the detector when the object surface is out of focus. During the OPD scan the width of this spurious interference pattern varies, resulting in another source of distortion of the measured signal. The combination of the geometrical and diffraction effects is illustrated in FIG. 3 where the interference pattern of a stepped object is shown close to the best focus position 302 and at an out of focus position 304 during an OPD scan.

The low-coherence scanning interferometry techniques described below feature another type of OPD scanning which, instead of maintaining the zero-OPD position near the focal plane of the microscope, scan the OPD while keeping at least a portion of the test object surface in focus. This type of OPD scanning has the advantage of overcoming the distortion effects described above.

For example, because the test object surface remains in focus, the low-coherence scanning interferometry techniques described below allow for high resolution two-dimensional lateral imaging of the test object surface onto the camera capturing the interference signals. Also, since blurring and diffraction effects do not affect the measurement, the interferometer may use an extended source and a high-numerical aperture objective lens, which have the benefit of providing higher lateral resolution and higher light efficiency. This measurement mode is particularly suited for object surfaces having height features smaller than the DOF of the imaging system.

Information obtained from the interference signal within an extended interference signal (e.g., the entire coherence envelope) can be analyzed to provide information about complex objects (such as thin film structures). This can be done by recording interferograms as a function of OPD for various points on a test surface. A transform (e.g., a Fourier Transform) can be used to generate a frequency-domain spectrum for each interferogram. Such spectra contain both magnitude and phase information as a function of the spatial frequency of the interferogram, which can be useful in identifying various surface characteristics. For example, there may be recognizable characteristics in the spectrum that are independent of surface height, such as, the average value of the magnitude spectrum, which is related to the overall reflectivity of the surface, or the variation in magnitude as a function of spatial frequency, which in a monochromatic high-NA system relates to the scattering angle of the reflected light.

Thus, even for a test surface that is nominally flat, it is useful to scan the OPD over a range that is on the order of the illuminating light coherence length (temporal or spatial), or larger. For example, a test surface containing a translucent film could have two main reflections at two scan locations corresponding to the top and bottom surfaces of the film. For thick films these reflections could produce two separate peaks in the coherence envelope that are separated by a distance corresponding to the film thickness. There may also be other peaks in the coherence envelope corresponding to multiple reflections in the film. For multiple thin films, the structure of the coherence envelope can also contain amplitude variations extending over a large range. Such examples have the potential for providing a coherence envelope that is several times larger than the coherence length of the source. At the same time the DOF of the imaging system can be small (e.g., smaller than the coherence length) to provide high lateral resolution without the large OPD scan distorting the image.

Figure 4:
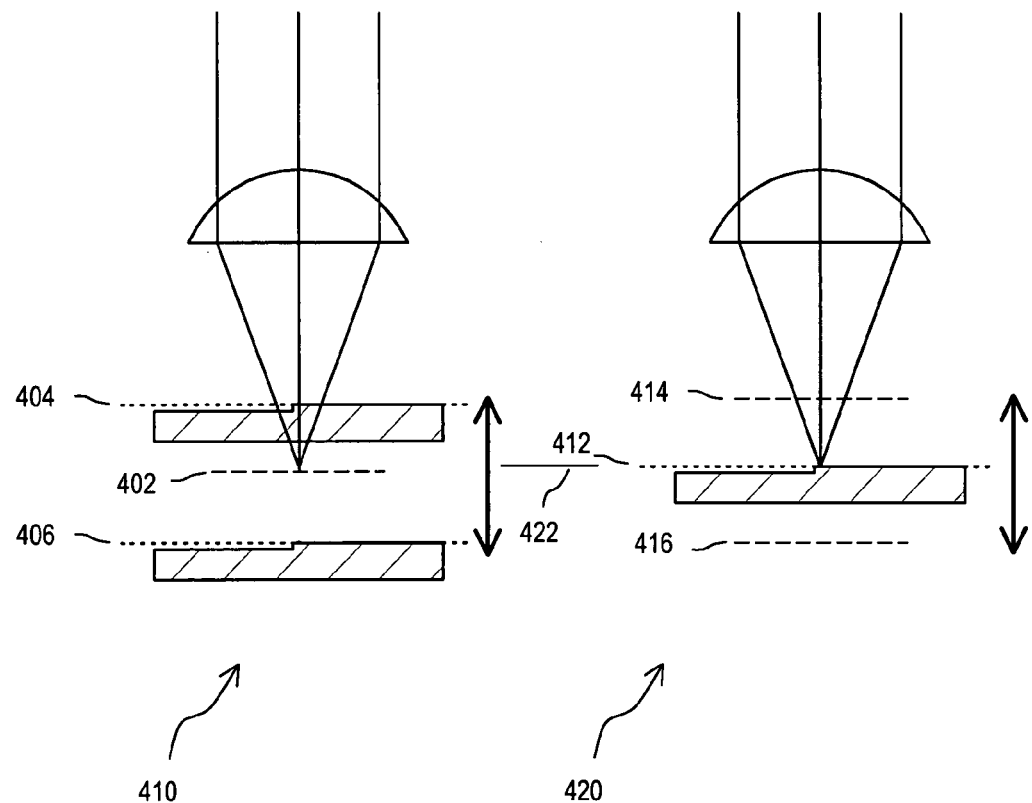
FIG. 4 shows two examples comparing two types of OPD scanning techniques.

FIG. 4 compares the prior art OPD scanning technique 410 with that disclosed herein 420 for a common focal position 422. OPD scanning technique 410 scans the test object surface relative to the zero-OPD position 402 between a first position 404 and a second position 406 while maintaining the zero-OPD position 402 at the focal position 422. OPD scanning technique 420 scans the zero-OPD position relative to the test object surface 412 between a first position 414 and a second position 416 while maintaining a portion of the test object surface 412 at the focal position 422.

Figure 5:
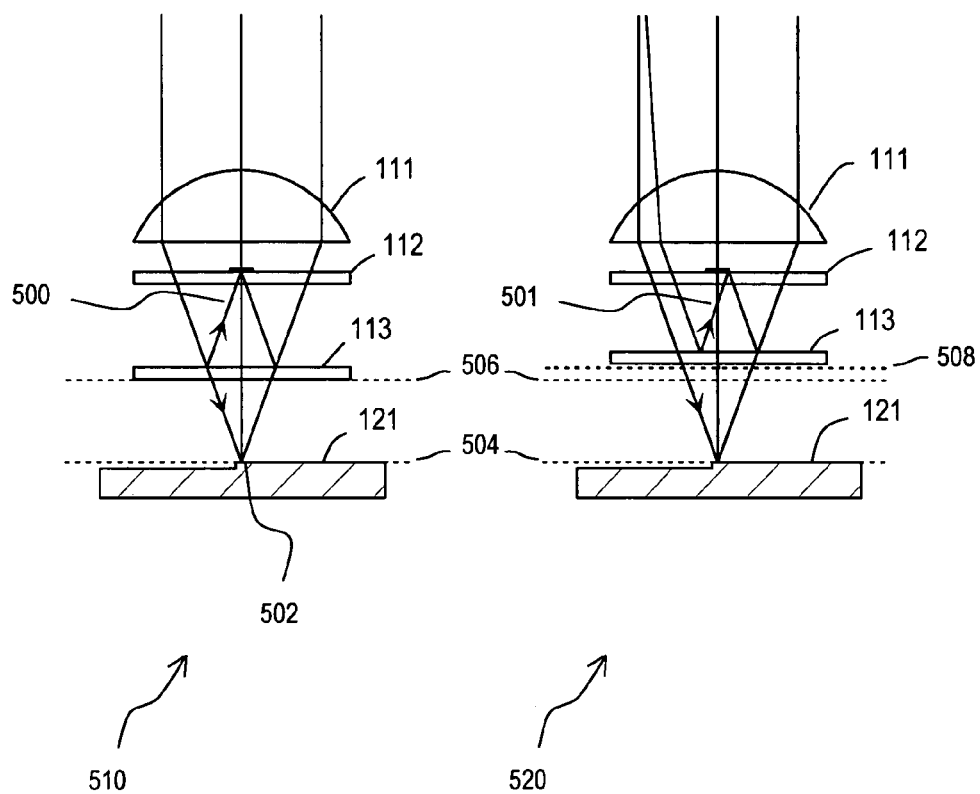
FIG. 5 shows two sketches of paths taken by light rays through a scanning Mirau assembly with a test object at a fixed location and a beam splitter at two different locations along an OPD scan.

There are various ways to scan the OPD while keeping the at least a portion of the test object surface in focus. FIG. 5 illustrates one of these ways by showing two arrangements, indicated by reference numerals 510 and 520, of paths taken by light rays through a scanning Mirau assembly with a test object at a fixed location 504 and the beam splitter at two different locations along an OPD scan. This scanning Mirau assembly is built in such a way that one or more actuators scan the OPD by moving the beam splitter from position 506 to position 508 while the test object surface remains in focus. The test object surface position 504 is such that at least some of its features lie within the DOF of the imaging system. In sketch 510 the beam splitter is at the zero-OPD position 506 where the OPD is essentially zero, at which point the reference surface is also within the DOF of the imaging system. In sketch 520 the beam splitter is at another OPD scan position 508, where the reference surface is out of focus and the reference illumination ray 501 is parallel to, but also laterally displaced with respect to original reference ray 500. The object surface remains in focus during the entire scan.

The interference signal is not distorted by the reference surface defocus when this surface is nominally flat and featureless. In that case the light collected by a single detector element reflects from a stationary region on the object surface, regardless of the OPD scan position or overall scan length. The discrimination of surface features is then only limited by the sampling of the object surface by the detector elements and the optical resolution limit of the imaging system. At the same time, the range of the OPD scan can be arbitrarily extended beyond the DOF of the imaging system.

Figure 6:
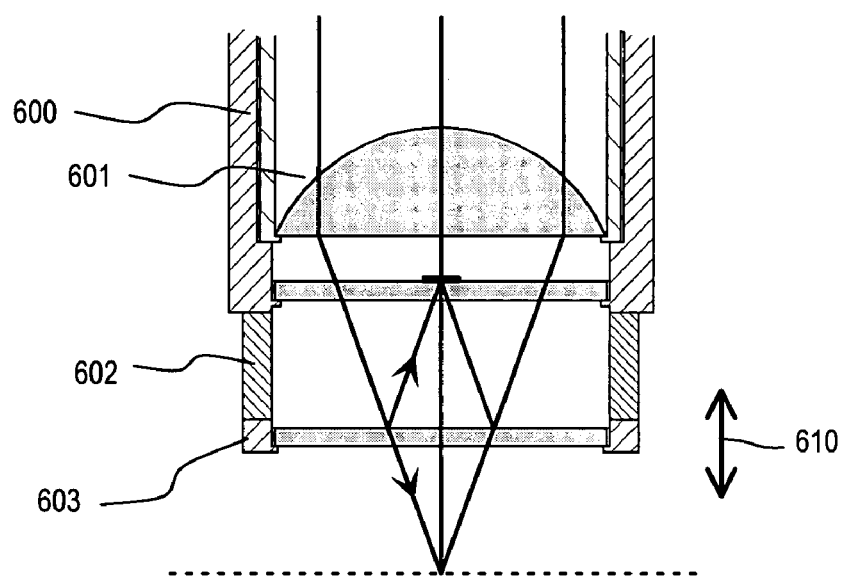
FIG. 6 shows an implementation of a scanning Mirau assembly achieving OPD scanning by moving the beam splitter.

FIG. 6 shows an implementation of a scanning Mirau assembly achieving OPD scanning by moving the beam splitter as described above. A microscope objective 601 is mounted inside the main body 600. A cylindrical piezoelectric actuator 602 is attached to main body 600 and carries beam splitter cell 603.

Figure 7:
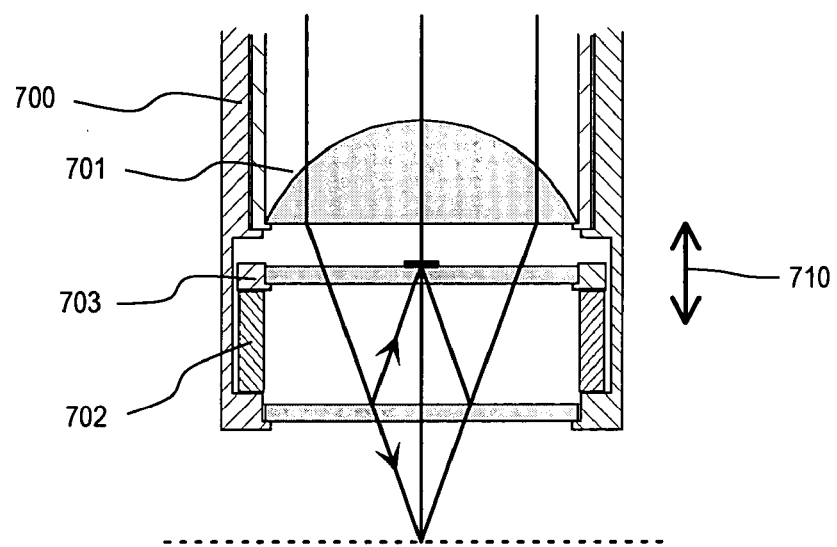
FIG. 7 shows an implementation of a scanning Mirau assembly achieving OPD scanning by moving the reference surface.

FIG. 7 shows another implementation of a scanning Mirau assembly. In this implementation the OPD is scanned by moving the reference surface. A microscope objective 701 is mounted inside main body 700. A cylindrical piezoelectric actuator 702 is attached to main body 700 and carries reference surface cell 703.

A displacement of the beam splitter cell 603 along the optical axis 610 in FIG. 6 results in a simultaneous increase of the object path and decrease of the reference path. The corresponding displacement of the reference surface cell 703 along the optical axis 710 in FIG. 7 only affects the reference path. Thus, a piezoelectric transducer (PZT) of a given length creates an OPD scan twice as long in the implementation shown in FIG. 6 compared to that shown in FIG. 7. However, both implementations scan the OPD while maintaining a portion of the test object surface in focus during the entire scan. Other implementations with the same property can be constructed. For example, the beam splitter and reference mirror can be mounted to a fixed frame that is itself mounted on a PZT. Other scanning mechanisms can also be used. For example, long-range scanners can be constructed using mechanical flexures that are actuated by a PZT.

Figure 8:
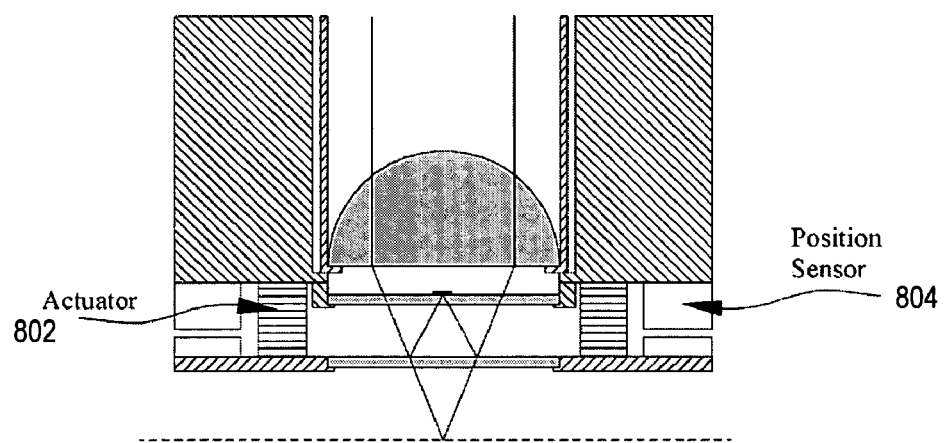
FIG. 8 shows an example Mirau assembly configuration where a position sensor monitors the displacement of the beam splitter.

The scanning Mirau assemblies can also be modified to include position sensors in the scanning mechanism. These sensors can be used in an open loop mode to acquire position data during the OPD scan. They can also be used in a close loop mode where they provide feedback to the electronics that drive the OPD scan. It is then possible to control the linearity and velocity of the OPD scan very accurately. FIG. 8 shows an example configuration where a position sensor 804 monitors the displacement of the beam splitter. Typical position sensors are capacitive sensors or strain gages.

Figure 9:
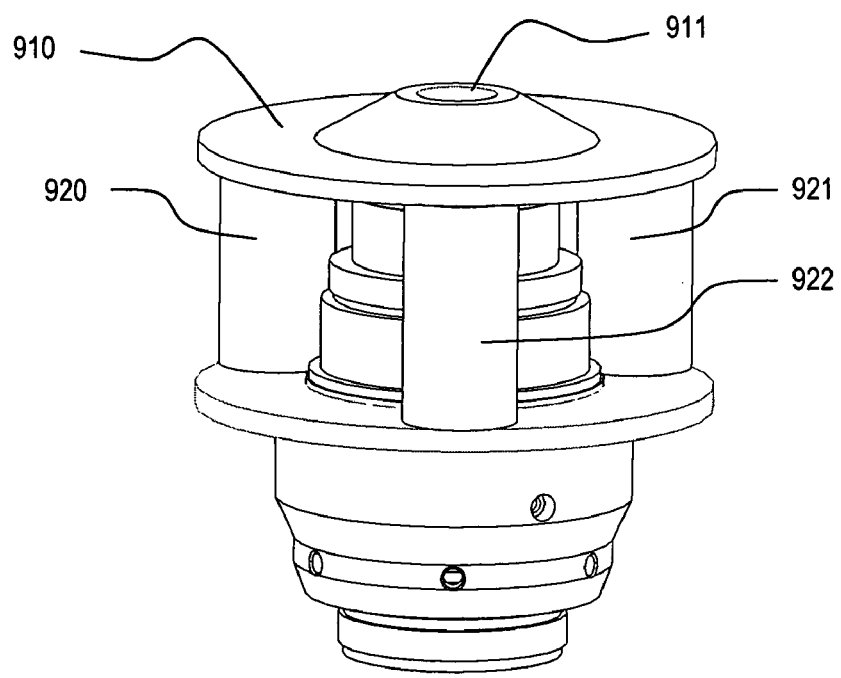
FIG. 9 shows an implementation of a scanning Mirau assembly where three actuators scan a beam splitter cell containing a beam splitter.

FIG. 9 shows an implementation of a scanning Mirau assembly where three actuators 920, 921 and 922 scan a beam splitter cell 910 containing a beam splitter 911. It is then possible to create OPD scans by activating all three actuators at the same speed. It is also possible to adjust the three actuators differentially to scan the beam splitter 911 along a tilted axis in order to adjust the tip and tilt of the reference surface with respect to the object plane of the imaging system. This additional capability is useful to ensure that the image of the reference surface after reflection off the beam splitter remains parallel to the plane defined by the image of the detector through the imaging system. Alternatively, to achieve this capability the reference object or a cell containing both beam splitter and reference object can be mounted on the three actuators. Position sensors can also be added to each actuator to provide feedback about the position of the beam splitter cell.

Before performing an OPD scan, various procedures can be used to align the positions of the reference surface and beam splitter, and to bring the test object surface into focus. One procedure uses a field stop (101 in FIG. 1) in the illumination system. The alignment procedure is as follows. Close the field stop so that its edge appears in the field of view of the imaging system without obscuring it entirely. Adjust the position of beam splitter and/or reference surface until the image of the field stop comes into sharp focus onto the detector. This can involve a manual adjustment knob or even the mechanism used later for generating the OPD scan. Bring the test object surface into the proper focus position by looking for the position of maximum interference modulation.

Another alignment procedure includes the following steps. Move the reference surface outside of the DOF of the imaging system. Move the test object surface along the optical axis and rely on visual examination or image processing to find the position where the test object surface is in sharpest focus. A possible image processing technique consists in looking for the test object position at which intensity gradients are maximized across test object features. Adjust the position of the reference surface to maximize interference modulation.

Another procedure can be used to determine both the best focus position for the test object surface and the reference path location that corresponds to the zero-OPD position. The procedure can be used for automated self-calibration of the system when using a calibration artifact. The procedure is as follows. An automated staging system moves the test object by small increments along the optical axis. For each test object position the system performs an OPD scan and generates a topographical map of the test object surface. The best focus position is chosen as the position that maximizes height gradients in the topographical map. This also defines the zero-OPD position of the reference path, which can be later used to bring other test objects into focus by maximizing interference modulation. When three actuators are used (as in FIG. 9) this procedure can be adjusted such that the processing of height gradient data is performed at three different locations in the field of view so that both piston and tip/tilt information are recovered from the alignment procedure.

All these alignment procedures can also be used to set up the instrument in a way that simplifies the loading of new test objects in the interferometer. Once the best-focus position for a given test object has been established with one of the above techniques a single OPD scan can be used to establish the position of the reference path actuator corresponding to the zero-OPD condition. This is equivalently the position where the reference surface is in focus and interference modulation is maximized. For example, the Frequency Domain Analysis (U.S. Pat. No. 5,398,113) technique allows processing the interference signal and calculating the mean height of the test object surface with respect to the starting position of the OPD scan. This mean height defines the scan offset that corresponds to the zero-OPD position.

When a new test object to be characterized is placed in front of the interferometer, it is convenient to drive the reference path actuator to the position corresponding to the zero-OPD condition. The task for a user or automation system then consists in maximizing interference modulation by moving the test object along the optical axis. Once maximum modulation is achieved the test object surface is nominally in focus.

Figure 10:
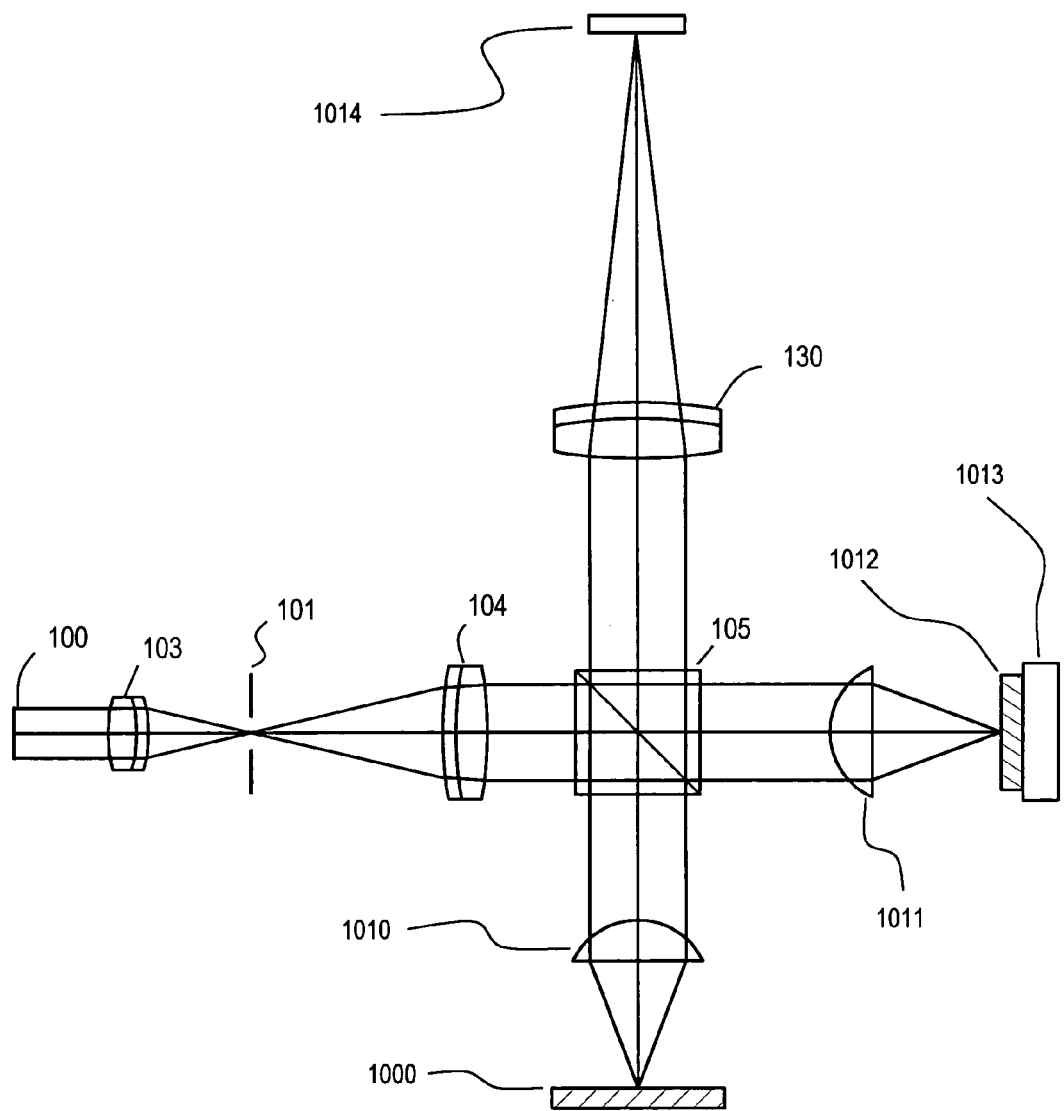
FIG. 10 shows a scanning Linnik interferometer.

Other types of interferometers can be used, besides the Mirau for scanning the OPD while keeping the at least a portion of the test object surface in focus. FIG. 10 shows a scanning Linnik interferometer, one such alternative. The test object surface 1000 is imaged by a microscope objective lens 1010 onto a detector 1014. A matched objective lens 1011 is used on the reference path. The reference surface 1012 is mounted onto a transducer 1013, for example, a PZT or some type of mechanical stage. The OPD scan is generated by the translation of the reference surface 1012 along the optical axis of the reference path. The object remains in focus during the entire scan. The techniques described to align the test object surface in the context of the scanning Mirau apply also for the scanning Linnik.

The limited coherence length of a low-coherence source used to localize fringes can be due to temporal coherence effects, spatial coherence effects, or a combination of temporal and spatial coherence effects. A temporal coherence length is associated with a broadband source as defined above. A spatial coherence length can be created by both the numerical aperture of the objectives and the transverse extent of the illumination source. In the particular case of imaging systems having large numerical apertures the different illumination directions created by an extended source generate different (i.e., resolvable by the processing algorithms) spatial frequency components in the recorded signal. Spectral analysis allows recovering information about interference phenomena corresponding to different angles of incidence. This angle of incidence discrimination capability is the basis for a range of surface characterization tasks. Applications include surface micro-ellipsometry, reflectometry and scatterometry measurements as well as the characterization of unresolved surface features.

When measuring the top surface topography of transparent materials or structures it is possible that light reflection at internal interfaces introduce distortions in the interference signal generated by the top surface. This happens for example when measuring a thin film structure. However, by using a spectrally broadband as well as extended illumination source it is possible to attenuate these spurious interference effects for a certain range of film thicknesses. In this context, it is also desirable to be able to capture the entire low-coherence interference signal, which might extend beyond the DOF, while maintaining the test object surface of interest in focus.

It is usually a benefit for an interferometer to have a large numerical aperture imaging system that provides high lateral resolution. Similarly, an extended illumination source has the benefit of increasing the amount of light going into the interferometer. However, the resulting limited spatial coherence restricts the extent of the coherence envelope. There are modes of operation of an interferometer, for example an interference microscope, where it is desirable to vary the imaging system NA, for example by changing the system magnification, without changing the shape of the coherence envelope of the measured interference signal. This has the benefit that the signal can always be sampled in the same fashion, regardless of source size or numerical aperture.

Figure 11:
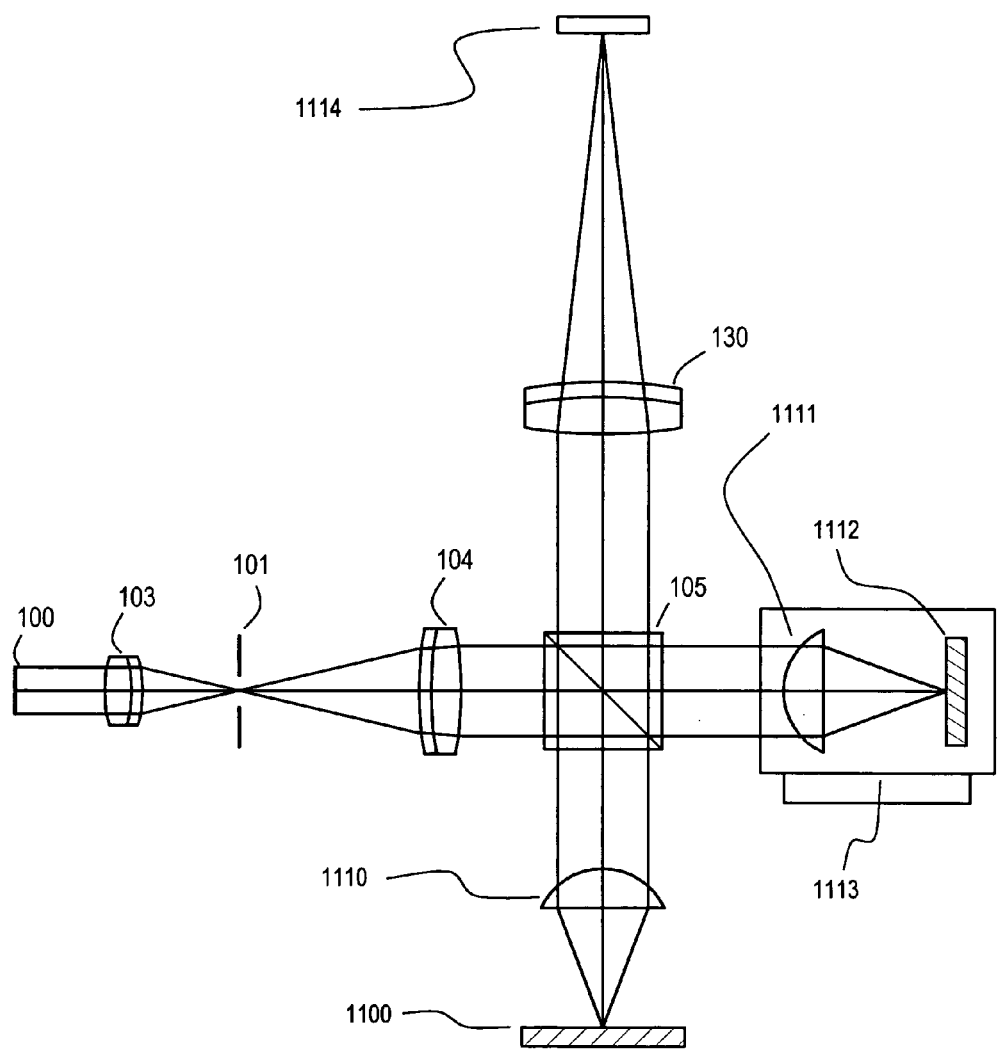
FIG. 11 shows a Linnik interferometer where the reference surface and reference objective lens are scanned simultaneously using a common transducer.

Implementations of interferometers maintaining a portion of the test object surface in focus are possible where the OPD is scanned in a way that provides this benefit by reducing (or substantially eliminating) spatial coherence effects. For example, FIG. 11 shows a Linnik interferometer where the reference surface 1112 and reference objective lens 1111 are scanned simultaneously using a common transducer 1113. The distances from reference surface 1112 to objective lens 1111 and from test object surface 1100 to objective lens 1110 are kept constant. It follows that rays reflecting from the reference surface at different angles of incidence see the same OPD variation during the OPD scan. The numerical aperture and source size do not influence the modulation envelope in this configuration. In particular, the shape of the coherence envelope is essentially defined by the source temporal coherence length, whereas spatial coherence has very little effect on the measurement. Furthermore, because the OPD scan is produced inside the reference path the test object surface remains in focus during the entire measurement sequence.

Another example of an interferometer providing the benefit of reduced spatial interference effects is the same Linnik interferometer configuration shown in FIG. 11 using a fairly narrowband source for PSI, instead of a broadband source for scanning interferometry. PSI is a surface profiling technique that relies on the acquisition of a number of digitized images of the interferogram produced during an OPD scan. The accuracy of the phase measurement increases with the number of images used for the calculation. However, a problem arises when coherence effects affect the interferogram contrast over the sequence of images, which is the case if the OPD scan range used during PSI acquisition becomes comparable to the DOF. The scanning shown in FIG. 11 using a common transducer 1113 for the reference objective lens 1111 and the reference surface 1112 allows capturing an arbitrary large number of images (over an OPD scan larger than the DOF) without such effects even when the interferometer has a limited spatial coherence, all the while maintaining the object surface into focus.

The scanning Mirau interferometers described above have other possible modes of operation. In one application the scanning capability is used in conjunction with one of the alignment procedures described above to regularly re-establish the position of the reference path such that the reference surface is in focus. This is particularly relevant for temperature variations that cause the focal plane of the imaging system to shift as a function of time. Periodic recalibration of the system can easily be automated, for example when ambient temperature has changed by more than a certain amount or when the ambient temperature gradient exceeds a given threshold.

In some applications the DOF of the imaging system can be quite large. In these cases the ability to adjust the apparent tip and tilt of the reference surface can be used to cancel out the effect of a relative tilt of the test object surface with respect to the interferometer. The reference path is adjusted so that a minimum number of interference fringes is visible across the test object surface. If the test object surface is flat the result is a nulled interferogram where the interferometric phase is constant across the test object surface. This nulling procedure indicates that the reference and test object rays that end on a given detector element have traveled through the same parts of the optics. Hence, optics imperfections such as refractive index inhomogeneities or surface defects do not influence, to first order, the phase measured by the instrument.

As suggested above, a simultaneous motion of the three actuators can produce the OPD scan once tip and tilt has been adjusted. Alternatively, it is also possible to use another scanning device to create the OPD scan, such as a piezoelectric transducer driven stage carrying the test object or the entire interference microscope objective assembly. The amount of tip and tilt correction to impart to the reference path can be determined from a preliminary OPD scan. The test object surface topography is calculated and the least-square fit of a plane surface through the measured data provides tip and tilt values that are then used to null the interferogram. A second OPD scan follows to capture data in the nulled-interferogram configuration.

Alternatively, external sensors can be used to pre-measure test object surface tilt. For example an autocollimator telescope measures test object orientation on a fixture that is then placed in front of the interferometer. The movement of the test object fixture should be repeatable so that test object surface tilt at the pre-measurement station and at the interferometer correlate.

The amount of correction of the three actuators is a function of the measured test object surface tilt and the location of the optical elements of the reference path. For example, if the actuators are attached to the reference surface, the angular adjustments of the reference surface are of the same magnitude as the pre-measured test object surface tilt. If instead the actuators are attached to the beam splitter the angular adjustments of the reference surface are only half that pre-measured on the test object surface.

Another application of a scanning Mirau interferometer relates to taking advantage of the interference phenomenon to measure the defocus of a test object surface. This defocus information can for example be fed as feedback to an auto focusing mechanism. Practically, the OPD scanner is pre-calibrated so that the OPD position yielding high-modulation fringes when the test object surface is in focus is known. If a defocused test object surface is placed in front of the interferometer the scanner location for which high-modulation fringes appear during an OPD scan is then compared to the position corresponding to best focus. The difference between the two locations is a measure of the surface defocus.

Other aspects, features, and advantages are within the scope of the following claims.

What is claimed is:

1. A method comprising:
   imaging test light reflected from at least a first portion of a test surface to interfere with reference light on a camera and form an interference pattern, wherein the imaging defines a depth of focus for the light reflected from the test surface, and wherein the test light and reference light are derived from a common source;
   varying an optical path length difference between the test light and reference light over a range larger than the depth of focus, wherein the optical path length difference corresponds to a difference between a first optical path between the common source and the camera for the test light and a second optical path between the common source and the camera for the reference light; and
   maintaining the first portion of the test surface within the depth of focus as the optical path length difference is varied.

2. The method of claim 1, further comprising collecting images of the interference pattern as the optical path length difference is varied.

3. The method of claim 1, wherein the common source has a coherence length and the optical path length difference is varied over a range larger than the coherence length.

4. The method of claim 3, wherein the coherence length of the common source is limited by the spectral bandwidth of the common source.

5. The method of claim 3, wherein the common source is a spatially extended source, and wherein the coherence length is limited by the spatial extent of the common source and a numerical aperture for light used to illuminate the test surface.

6. The method of claim 4, wherein the spectral bandwidth is greater than 10% of the mean wavelength.

7. The method of claim 5, wherein the numerical aperture is greater than 0.3.

8. The method of claim 1, wherein the test surface is a part of a thin film structure.

9. The method of claim 1, wherein the imaging comprises using a beam splitter to separate light emitted from the common source into the reference light and the test light.

10. The method of claim 9, wherein the imaging further comprises directing the reference light to reflect from a reference surface.

11. The method of claim 10, wherein the varying of the optical path length difference comprises varying the position of the reference surface.

12. The method of claim 10, wherein the test light is transmitted through the beam splitter and wherein varying the optical path length difference comprises varying the position of the beam splitter.

13. The method of claim 10, wherein the test light is transmitted through the beam splitter and wherein varying the optical path length difference comprises varying the position of the beam splitter and the reference surface.

14. The method of claim 10, further comprising using an objective positioned prior to the beam splitter to direct the reference light onto the reference surface.

15. The method of claim 10, further comprising using an objective positioned between the beam splitter and the reference surface to direct the reference light onto the reference surface.

16. The method of claim 15, wherein the varying of the optical path length difference comprises varying the position of the reference surface.

17. The method of claim 15, wherein the varying of the optical path length difference comprises simultaneously varying the position of the reference surface and the objective.

18. The method of claim 10, further comprising adjusting an angular orientation of at least one of the reference surface and the beam splitter to cause an image of the camera through the imaging system to be substantially parallel to the reference surface.

19. An apparatus comprising:
an interferometric imaging system configured to image test light reflected from at least a first portion of a test surface to interfere with reference light on a camera and form an interference pattern, wherein the interferometric imaging system defines a depth of focus for the light reflected from the test surface, and wherein the test light and reference light are derived from a common source,
wherein the interferometric imaging system is configured to maintain the first portion of the test surface within the depth of focus as an optical path length difference between the test light and the reference light is varied, wherein the optical path length difference corresponds to a difference between a first optical path between the common source and the camera for the test light and a second optical path between the common source and the camera for the reference light; and
an electronic control system which during operation causes the interferometric imaging system to vary the optical path length difference over a range larger than the depth of focus of the imaging system and maintain the first portion of the test surface within the depth of focus as the optical path length difference is varied.

20. The apparatus of claim 19, further comprising the camera, wherein the camera is coupled to the electronic control system and configured to collect images of the interference pattern as the optical path length difference is varied.

21. The apparatus of claim 19, further comprising the common source, and wherein the common source has a coherence length and wherein the electronic control system is configured to cause the interferometric imaging system to vary the optical path length difference over a range larger than the coherence length.

22. The apparatus of claim 21, wherein the coherence length of the common source is limited by the spectral bandwidth of the common source.

23. The apparatus of claim 21, wherein the common source is a spatially extended source, and wherein the coherence length is limited by the spatial extent of the common source and a numerical aperture for light used to illuminate the test surface.

24. The apparatus of claim 22, wherein the spectral bandwidth is greater than 10% of the mean wavelength.

25. The apparatus of claim 23, wherein the numerical aperture is greater than 0.3.

26. The apparatus of claim 19, the interferometric imaging system comprises a beam splitter to separate light emitted from the common source into the reference light and the test light.

27. The apparatus of claim 26, wherein the interferometric imaging system is further configured to direct the reference light to reflect from a reference surface.

28. The apparatus of claim 27, wherein the interferometric imaging system is configured to vary the optical path length difference by varying the position of the reference surface.

29. The apparatus of claim 27, wherein the interferometric imaging system is configured to transmit the test light through the beam splitter and vary the optical path length difference by varying the position of the beam splitter.

30. The apparatus of claim 27, wherein the interferometric imaging system is configured to transmit the test light through the beam splitter and vary the optical path length difference by varying the position of the beam splitter and the reference surface.

31. The apparatus of claim 27, wherein the interferometric imaging system further comprises an objective positioned prior to the beam splitter to direct the reference light onto the reference surface.

32. The apparatus of claim 27, wherein the interferometric imaging system further comprises an objective positioned between the beam splitter and the reference surface to direct the reference light onto the reference surface.

33. The apparatus of claim 32, wherein the interferometric imaging system is configured to vary the optical path length difference by varying the position of the reference surface.

34. The apparatus of claim 32, wherein the interferometric imaging system is configured to vary of the optical path length difference by simultaneously varying the position of the reference surface and the objective.

35. The apparatus of claim 27, wherein the interferometric imaging system is configured to adjust an angular orientation of at least one of the reference surface and the beam splitter to cause an image of the camera through the imaging system to be substantially parallel to the reference surface.

* * * * *